United States Patent [19]

Mann

[11] 4,397,201

[45] Aug. 9, 1983

[54] HYDROSTATIC-MECHANICAL DRIVE FOR SELF-PROPELLED MACHINES

[75] Inventor: Egon Mann, Friedrichshafen, Fed. Rep. of Germany

[73] Assignee: Zahnradfabrik Friedrichshafen, Aktiengesellschaft, Friedrichshafen, Fed. Rep. of Germany

[21] Appl. No.: 199,822

[22] Filed: Oct. 23, 1980

[30] Foreign Application Priority Data

Oct. 26, 1979 [DE] Fed. Rep. of Germany ....... 2943281

[51] Int. Cl.³ .............................................. F16H 47/00
[52] U.S. Cl. ..................... 74/730; 324/173; 74/769; 417/42
[58] Field of Search ...................... 74/730, 606 R, 769, 74/768; 324/173; 91/473; 417/42

[56] References Cited

U.S. PATENT DOCUMENTS

| | | | |
|---|---|---|---|
| 2,313,548 | 3/1943 | Hoge | 74/606 R |
| 3,213,712 | 10/1965 | Swift | 74/730 |
| 3,732,494 | 5/1973 | Dragon | 324/173 |
| 4,194,414 | 3/1980 | Satoh | 74/674 |
| 4,279,576 | 7/1981 | Okano | 324/173 |
| 4,302,724 | 11/1981 | Grover | 324/173 |
| 4,329,064 | 3/1982 | Mann | 366/61 |

FOREIGN PATENT DOCUMENTS

| | | | |
|---|---|---|---|
| 2753246 | 5/1979 | Fed. Rep. of Germany | 74/768 |
| 1400801 | 6/1972 | United Kingdom | 324/173 |
| 1400802 | 6/1972 | United Kingdom | 324/173 |
| 2027896 | 3/1979 | United Kingdom | 324/173 |

*Primary Examiner*—Kenneth Dorner
*Assistant Examiner*—D. Wright
*Attorney, Agent, or Firm*—Karl F. Ross; Herbert Dubno

[57] ABSTRACT

A hydrostatic-mechanical drive for a load, e.g. a self-propelled machine such as a concrete mixer comprising a hydrostatic motor which can be connected to the load via a mechanical transmission. According to the invention, the shaft of the hydrostatic motor extends into the control plate or cover thereof (through which hydraulic communication is made with the drum carrying the axial pistons of the motor) and is provided with an inductive sensor on this plate to form a pulse generator (with a metal gear on the shaft) whose output represents a parameter of rotation of the motor.

5 Claims, 1 Drawing Figure

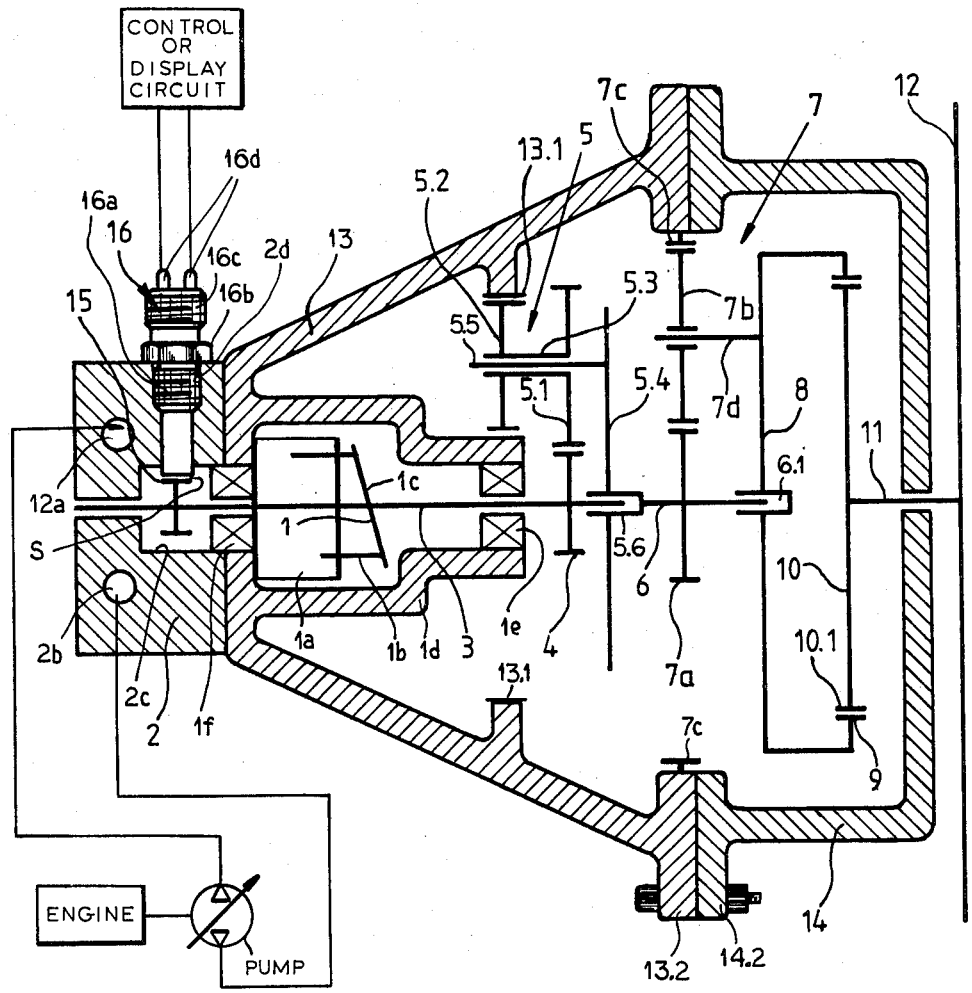

HYDROSTATIC-MECHANICAL DRIVE FOR SELF-PROPELLED MACHINES

CROSS REFERENCE TO RELATED APPLICATION

The present application is related to the commonly assigned copending application Ser. No. 116,978 filed Jan. 30, 1980 by myself and Helmet Eymuller and entitled "Hydrostatic-Mechanical Drive for Vehicular Cement Mixers," now U.S. Pat. No. 4,329,064 issued May 11, 1982.

FIELD OF THE INVENTION

The present invention relates to a hydrostatic-mechanical drive for self-propelled construction machinery utilizing hydraulic power for either or both the propulsion of the vehicle or the driving of a working load thereof. More particularly, the invention relates to hydrostatic-mechanical transmissions in which a load is ultimately driven by a hydrostatic motor.

BACKGROUND OF THE INVENTION

For a variety of load-operating purposes it is advantageous to couple a prime mover, such as an internal combustion engine, with a load via a hydrostatic transmission, with or without a mechanical transmission. In a typical hydrostatic transmission, the internal combustion engine drives a so-called hydrostatic pump which generally has a drum rotatable about an axis and provided with a plurality of angularly equispaced pistons which cooperate with a control plate inclined to the axis so that each piston is reciprocated in a respective cylinder upon rotation of the drum. Alternatively, the hydrostatic pump can have a stationary drum and the excursion of the pistons can be induced by the rotation of an inclined plate which is frequently referred to as a swash plate.

In axial piston pumps the drum abuts or communicates with a valve plate or control plate having kidney-shaped or arcuate openings communicating with the high-pressure and low pressure ports and any relief, pressure-control or other valves which may be required. The other side of the hydrostatic transmission comprises a hydrostatic motor which likewise has a drum formed with axial pistons and rotatable relative to a valve plate while its axial pistons bear upon an inclined plate connected to a shaft or reacting against an inclined plate while the drum is connected to the shaft. The two ports of the valve plate of the motor are connected to the two ports of the pump and, upon rotation of the pump and depending upon the inclination of the plate thereof, the motor is driven in one or another sense at a variable speed.

Reference is made, in this connection, to pages 397 and 398 of *Servomechanism Practice*, McGraw-Hill Book Company, New York, 1960 wherein a pump and motor of the aforedescribed type are illustrated.

The hydrostatic motor, therefore, comprises three basic elements, namely, the valve plate through which fluid communication is made to the cylinder drum which cooperates with this plate and has the angularly spaced cylinder bores and pistons, and the output shaft which is connected to the inclined plate and/or drum against which the pistons react.

In hydrostatic-mechanical drive systems, the output shaft of the motor can be connected to the load via a mechanical transmission, e.g. planetary gearing, and reference is made to the aforementioned copending application which shows a typical application of a hydrostatic-mechanical transmission in which the pump is driven by a prime mover and is hydraulically connected to a fixed-displacement hydrostatic motor in turn connected to a cement mixer drum by a mechanical transmission. Other typical applications of hydrostatic motors in construction machinery and vehicles are the drive of a crane turntable or cable drum, individual drives for the vehicle wheels, and control of booms of various types.

For all these application it is desirable to monitor the operation of the load, generally at a location remote therefrom, especially since the response of a hydrostatic motor to a change in conditions at the prime mover or a pump adjustment, may not always provide the same response at the hydrostatic motor. Such monitoring is advantageous for control of driving conditions when the vehicle is traveling or for sensitive functioning of the load and to ensure maximum operating efficiency.

A variety of electrical and electronic control and display arrangements have been provided heretofore for operating conditions of a load and their importance has led to widespread application of electronic techniques in monitoring.

For example, in construction and other machinery operated by a single person for reasons of economy, the operator cabin is centrally located, often remote from a particular load although the latter is controlled by him. The operator may not even be able to see the load and frequently is unable to visually ascertain a parameter of its operation, for example, its speed. In such cases, the operating speed of the load, although an important and frequently vital item of information, may not be available in the absence of electronic monitoring systems. Since such operating parameters may not be available, obviously the response to an operator control may not be easily monitored.

When it has been desirable to electrically or electronically monitor the rotary speed of the load, a tachometer or the like could generally be coupled to a rotating portion to provide the desired output.

However, in the case of hydrostatic-mechanical drives of the aforementioned type this has frequently been impossible or impractical.

Because such drives are often used where space is at a premium, the hydrostatic motor and any directly adjoining speed-reducing mechanical gearing are generally provided in a compact housing directly adjoining the load. For practical reasons it is difficult if not impossible to monitor the speed of the mechanical transmission elements such as gearing and the like and, for the most part, electronic control of such systems has not been effected although the advantages of modern electronic monitoring systems, for example, microprocessor controls, in conjunction with accurate input information as to speed, has been recognized heretofor.

The simple attachment of an ordinary tachometer to the shaft of the drive, i.e. a part with a relatively low peripheral speed, has proved to be inadequate. The output frequencies of such tachometers was too low to enable it to be used in conjunction with microprocessors and like circuitry.

OBJECTS OF THE INVENTION

It is, therefore, the principal object of the present invention to provide an improved hydrostatic mechanical drive whereby the aforementioned disadvantages are obviated.

Another object of the invention is to provide an improved system for monitoring the speed of a hydrostatic-mechanical drive of the aforementioned type.

Still another object of the invention is to provide a system whereby an inductive sensor can be used to provide a train of pulses signaling the speed of a hydrostatic-mechanical transmission in such form as to allow the pulse train to be used for control purposes in conjunction with microprocessor circuitry.

SUMMARY OF THE INVENTION

These objects and others which will become apparent hereinafter are attained, in accordance with the present invention, in a hydrostatic-mechanical drive for a load on a vehicle, e.g. the propulsion wheels or a working implement of the vehicle, which comprises a hydrostatic motor and a mechanical connection between the motor and the load, e.g. including a gear transmission and wherein the shaft of the hydrostatic motor is extended into the control plate or cover of the motor, which plate or cover receives the control or regulating valves thereof, this shaft extension is provided within the control plate with a metal gear wheel having a peripheral array of equispaced metal teeth and juxtaposed with the periphery of this gear wheel, an inductive sensor is provided which responds to the passage of each tooth to generate a corresponding pulse which can be applied to a microprocessor controller or monitor or display of the speed of the shaft and hence the load. The inductive sensor is likewise mounted directly in the control plate of the hydrostatic motor.

By mounting the inductive sensor in the control plate or cover of the hydrostatic motor, it is accessible in a simple and replaceable manner and yet is fully protected without requiring disassembly of the drive housing. Advantageously, the drive housing can comprise a two-part structure flanged together, including a cylindrical member proximal to the load and through which the output shaft extends, and a frustoconical member which is formed at its narrow end with a casing for the hydrostatic motor within the drive housing. In this case, the valve plate or cover is mounted upon the small base of the frustocone to directly engage the drum or to engage an end wall of the casing which communicates between the drum of the hydrostatic motor and the control plate or cover.

By mounting a gear upon the shaft extension, I am able to increase the peripheral speed of the array of teeth so that the pulse generation rate is sufficient to enable the system to operate with microprocessors and the like.

The precise spacing of the sensing end of the detector from the gear can be adjusted with ease by threading the sensor to establish the proper spacing.

The system of the present invention is applicable to all hydrostatic motors having a control plate, cover or valve block in all commercial constructions, with or without mechanical transmissions. So that the hydrostatic motor can be used alone or integrated with such transmissions without modification with respect to the pulse generator formed by the gear wheel and the inductive sensor.

The transmission of the invention has been found to be especially effective for driving the mixing drum of vehicular concrete mixers which discharge the mix at the rear of the vehicle or over the cab thereof via conveyor troughs and the like. It is also highly advantageous for power shovels and like excavating machines, bulldozers, graters, and like construction vehicles.

BRIEF DESCRIPTION OF THE DRAWING

The above and other objects, features and advantages of the present invention will become more readily apparent from the following description, reference being made to the accompanying drawing in which the sole FIGURE is a cross-section view through a hydrostatic-mechanical drive embodying the invention and shown in highly diagrammatic form.

SPECIFIC DESCRIPTION

The hydrostatic-mechanical transmission of the drawing, which operates in the manner described in the aforementioned copending application, comprises a hydrostatic motor 1 which has only been shown in outline form and can include, in the usual manner, a cylindrical drum 1a formed with angularly equispaced cylinder bores parallel to the axis of the drum along which the shaft 3 extends. Structural details of this fixed-displacement hydrostatic motor can be found in the *Servomechanism Practice* description mentioned earlier. The axial pistons 1b of this motor react against an inclined plate 1c which is connected to the shaft. The hydraulic connections with the drum are effected through a control or valve plate 2 which contains the usual hydraulic valves and ports 12a and 2b for connection to the pressure and suction sides of the pump in the usual manner. Structural details of this control plate have been omitted since the plate itself can be of any conventional construction.

At opposite ends of the casing 1d enclosing the hydrostatic motor, there can be provided combination bearings and seals 1e and 1f.

The shaft 3 of the hydrostatic motor is provided with a gear 4 which drives a planet wheel 5.1 of a first planetary gear transmission stage 5. The planet wheel 5.1 is journaled on a shaft 5.5 which rotates freely on the shaft 3 via bearings 5.6 and 6.1 being connected to a shaft 6. The planet wheel 5.1 is rigid with a shaft 5.3 which also carries a planet wheel 5.2 meshing with a ring gear 13.1 connected to the frustoconical housing part 13.

The planet carrier 5.4 is a disk which is rigid with the shaft 6 and a second stage of the transmission is formed with a gear 7a forming a sun gear rotated by shaft 6 and meshing with a planet gear 7b journaled on a shaft 7d of a planet carrier 8. The second stage planetary gearing 7 also includes a ring gearing 7c fixed to the housing part 13.

The planet carrier 8 is here journaled by the bearing 6.1 upon the intermediate shaft 6 and is formed with a gear 9 splined to the externally toothed gaer 10 at its outwardly directed teeth 10.1.

The output gear 10 is rigid with the shaft 11 which is journaled in the housing part of cover 14 and which is fixed externally thereof to the mixer drum represented at 12. The cylindrical cover 14 is affixed to the large base of housing part 13 by flanges 13.2 and 14.2.

According to the invention, the shaft 3 is extended beyond the end of the housing 13 into the valve plate 2 and is provided with an array of angularly equispaced metallic teeth in the usual manner on a gear 15. The toothed periphery of this gear 15 confronts an inductive sensor 16 of any conventional design, advantageously having a threaded body 16a which can be screwed into a thread bore 2d of the valve plate 2 until a nut 16b bears against the latter to establish the spacing S between the sensor and the gear teeth. The outer end of the sensor 16 is threaded at 16c to accommodate a connector which makes electrical contact with the terminals 16d which can run to a microprocessor control or conventional speed display circuitry.

I claim:

1. In a vehicle transmission to drive a working load or to propel the vehicle by rotating a wheel forming the load, wherein the transmission comprises a hydrostatic motor having an output shaft and a cylinder drum communicating with a pump through a valve plate, said shaft being mechanically connected to said load, the improvement which comprises a metal gear wheel mounted on said shaft and lying wholly within said plate and having a circumferential array of teeth, and an inductive sensor received in said plate and juxtaposed with the periphery of said wheel wholly within said valve plate for generating a pulse train for application to an electric circuit.

2. The improvement defined in claim 1 wherein said inductive sensor has an externally threaded body and an abutment at an end of the thread of said body, said plate being formed with a radial internally threaded bore receiving said body.

3. The improvement defined in claim 1 or claim 2, further comprising a mechanical transmission connecting said shaft to said load.

4. The improvement defined in claim 3, further comprising a housing enclosing said mechanical transmission and said hydrostatic motor, said housing comprising, a cylindrical housing portion having a planar bottom disposed adjacent said load, and a frustoconical housing portion flanged to said cylindrical housing portion and having a small end carrying said plate receiving said hydrostatic motor.

5. The improvement defined in claim 4 wherein said mechanical transmission comprises a sun gear affixed to said shaft on the opposite side of said hydrostatic motor from said wheel, a planetary gear meshing with said sun gear and rotatable on a planet carrier coaxial with said sun gear and rotatable on an intermediate shaft thereto, a first ring gear mounted on said frustoconical housing portion and meshing with said planetary gear, a further sun gear connected to said intermediate shaft, a second planet gear meshing with said further sun gear, a second planet carrier for said second planetary gear and a further gear mounted on said second planet carrier, said load being connected to said further gear by an output gear splined thereto and having an output shaft traversing the bottom portion of said cylindrical housing portion.

* * * * *